Jan. 12, 1971   W. ELLERMEYER   3,555,432
HIGH-SPEED AC/DC CONVERTER
Filed Jan. 22, 1969
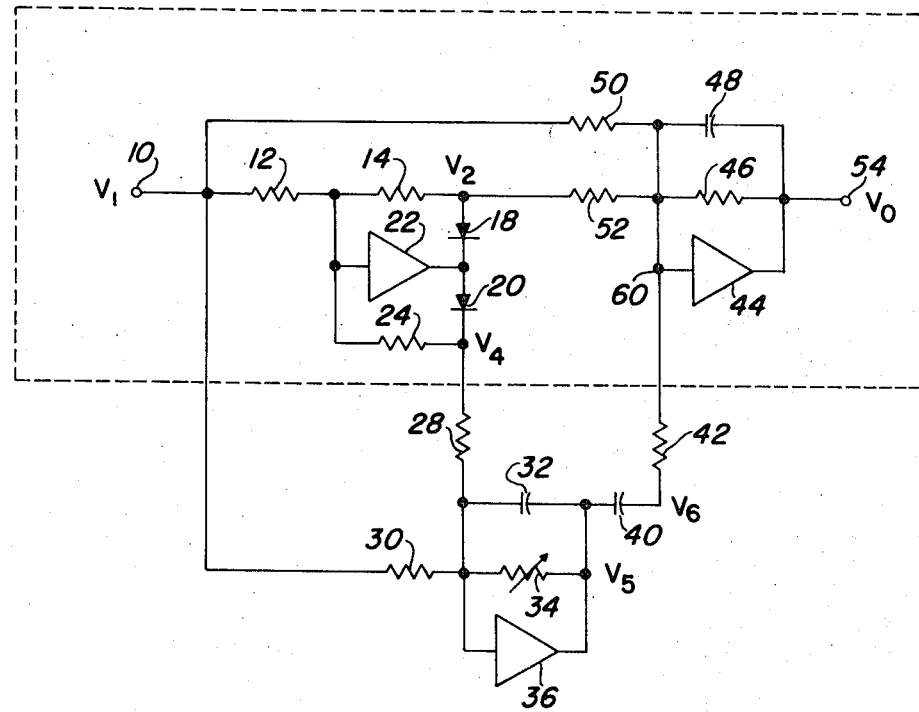
INVENTOR.
WALTER ELLERMEYER
BY
ATTORNEYS

United States Patent Office 3,555,432
Patented Jan. 12, 1971

3,555,432
HIGH-SPEED AC/DC CONVERTER
Walter Ellermeyer, San Diego, Calif., assignor to the United States of America as represented by the Secretary of the Navy
Filed Jan. 22, 1969, Ser. No. 793,123
Int. Cl. H03k 5/00
U.S. Cl. 328—26                    2 Claims

ABSTRACT OF THE DISCLOSURE

An improved high-speed AC to DC converter is disclosed which has a response time superior to that of existing converters. That is, the DC output of the converter reaches its steady state value in a shorter time period than is possible with existing AC to DC converters. The improvement in response time is achieved by a unique circuit arrangement including a plurality of operational amplifiers. By means of the unique arrangement, a comparatively large voltage proportional to the input voltage is added to the DC output initially and until the DC output reaches its steady state value. The large voltage allows a capacitor in filter circuit to charge more rapidly thereby significantly decreasing the time required for the DC output voltage to reach a steady state value. Furthermore, the converter of the present invention features increased accuracy and precision.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention comprises an improved high-speed AC to DC converter circuit in which the response time of the steady state output signal is significantly decreased.

Existing AC to DC converters employ capacitive filters to "average" or smooth the output voltage of the converter into a DC value approximately equal to the rectified average value of the input AC voltage. If the converter is electrically open, the output will remain at whatever value it had at the instant of opening or at least until the capacitor in the filter has discharged appreciably. Unless the average or filter has a sufficiently long time constant, the value that it "remembers" will depend upon the particular instant in the cycle of input voltage at which the circuit was opened. However, if the time constant of the circuit is sufficiently long to eliminate ripple, its response to a change in the envelope magnitude of the input voltage may be sluggish, and may require several cycles of the input voltage to achieve a true steady state value. Thus, the true average value may exist only when a waveform of the input voltage has been at equilibrium for a long period of time.

Furthermore, in AC to DC converters which employ operational amplifiers, the errors of the operational amplifiers are usually additive. That is, each operational amplifier introduces its individual error to produce a total error in the output equal to the sum of the individual errors. Due to this error additive characteristic several existing AC to DC converter circuits require high quality operational amplifiers in their operation to reduce the error in the converter output.

SUMMARY OF THE INVENTION

The present invention comprises an improved AC to DC converter in which the DC output achieves its steady state value in a significantly shorter time period than is possible with existing converter circuits. By using a unique converter circuit including several operational amplifiers a significant improvement in performance is realized. This improvement in performance is accomplished by adding to the DC output initially a comparatively large voltage proportional to the input voltage until the DC output reaches its steady state value. Due to the large voltage which is added to the DC output, a capacitor in the filter circuit charges more rapidly than it would without the superimposed large voltage; thus, the time required for the DC output to reach a steady state value is significantly decreased. The improved converter thus reduces the response time and increases the precision and accuracy of the circuit and yet maintains adequate filtering.

STATEMENTS OF THE OBJECTS OF THE INVENTION

An object of the present invention is to provide an improved high-speed AC to DC converter in which the DC output reaches its steady state value in a shorter period than is possible with existing AC to DC converter circuits.

Another object of the present invention is to provide an improved AC to DC converter in which greater accuracy in the DC output is achieved.

Another object of the present invention is to provide a low cost improved AC to DC converter.

BRIEF DESCRIPTION OF THE DRAWING

In the drawing:
The figure shown is a schematic wiring diagram of the AC to DC converter of the present invention.

DESCRIPTION OF THE PREFERRED EMBODIMENT

In the figure shown $V_1$ is an AC voltage which is to be converted into a DC output voltage $V_0$, $V_1$ is applied to input terminal 10 and is coupled through resistor 12 to the input of operational amplifier 22 which has two feedback paths: one through diode 18 and resistor 14, and one through diode 20 and resistor 24. The rectified output of amplifier 22 is applied to amplifier 44 through resistor 52 and to amplifier 36 through resistor 28. Resistors 50 and 30 are connected to input terminal 10 such that resistor 50 applied voltage input $V_1$ to amplifier 44, and resistor 30 applies the input voltage $V_1$ to amplifier 36. Load resistor 34 is connected across the output of amplifier 36, and load resistor 46 is connected across the output of amplifier 44. Resistor 46 applies output voltage $V_0$ to output terminal 54. Filter capacitors 48 and 32 are connected across load resistors 46 and 34, respectively. The voltage output $V_5$ of amplifier 36 is applied to the input of amplifier 44 through the series combination of capacitor 40 and resistor 42.

OPERATION

In explaining the operation of the AC to DC converter of the present invention it is necessary to develop certain circuit equations; therefore to simplify the development and discussion of these circuit equations, the resistors designated by numerals in the figure shown will herein-after be referred to according to the designation indicated in the table below:

| | |
|---|---|
| 12 | $R_1$ |
| 14 | $R_2$ |
| 24 | $R_3$ |
| 50 | $R_4$ |
| 30 | $R_5$ |
| 52 | $R_6$ |
| 28 | $R_7$ |
| 34 | $R_8$ |
| 42 | $R_9$ |
| 46 | $R_{10}$ |

The operation of that portion of the converter included within the dash lines will be described first. Voltage $V_1$, the input applied to input terminal 10, is the AC voltage to be converted into the DC output voltage $V_0$ at output terminal 54. The positive half cycle of $V_1$ will be designated $V_{1p}$ and the negative half cycle of $V_1$ will be designated $V_{1n}$. Input voltage $V_1$ is applied to the input of operational amplifier 22 through resistor $R_1$. During the positive half cycle, $V_{1p}$, diode 18 conducts causing feedback current to flow through load resistor $R_2$ and causing $V_2$ a negative half-wave rectified signal, to appear across resistor $R_6$, an input resistor of operational amplifier 44.

Voltage $V_{1p}$ is simultaneously applied to summing junction 60 of amplifier 44 through resistor $R_4$. Thus, operational amplifier 44 functions as an adder which adds $V_{1p}$ and $V_2$ during the positive half cycle of the input voltage. Assuming that $R_2=2R_1$, and $R_4=R_6=R_{10}$, it can be shown by simple circuit analysis that:

$$V_2 = \left(-\frac{V_{1p}}{R_1}\right) R_2 = -2V_{1p}$$

With capacitor 48 not in that part of the circuit which is operative, during $V_{1p}$, it can be shown that the output voltage developed is:

$$V_0 = \left(-\frac{V_2}{R_6}\right) R_{10} - \left(\frac{V_{1p}}{R_4}\right) R_{10} = 2V_{1p} - V_{1p} = V_{1p}$$

During $V_{1n}$, the negative half-cycle of $V_1$, diode 20 conducts, producing voltage $V_4$ which does not effect $V_0$ if the portion of the circuit shown outside the dash lines is not actively operative. $V_{1n}$ is simultaneously applied to amplifier 44 through resistor $R_4$. With capacitor 48 not actively operative, output voltage during the negative half cycle of $V_1$ is developed as follows:

$$V_0 = \left(-\frac{V_{1n}}{R_4}\right) R_{10} = -V_{1n}$$

Since $V_{1n}$ is the negative half-cycle of the input voltage, $-V_{1n}$ is a positive voltage. Thus the output voltage of that portion of the converter shown enclosed in dash lines is equal to a positive full wave rectification of input voltage $V_1$.

Capacitor 48 filters out the AC components of output voltage $V_0$, making $V_0$ equal to the average value of the rectified input voltage $V_1$. The value of $R_{10}$ may be selected so that $V_0$ is equal to the RMS value of $V_1$ instead of the average value. The addition of capacitor 48 to that portion of the circuit of FIG. 1 enclosed within the dash lines increases the time which is required for $V_0$ to reach a steady state value. The larger the value of capacitor 48, the less ripple there will be on output voltage $V_0$, but the larger the value of capacitor 48, the longer will be the time required for $V_0$ to reach its ready state value.

When the input voltage $V_1$ is removed from the input terminal 10, the voltage across capacitor 48 acts upon amplifier 44 so that it maintains the value of $V_0$. Capacitor 48 then discharges through the high input impedance of amplifier 44. About the same length of time is required for the output voltage $V_0$ to return to zero after the input voltage $V_1$ is disconnected from the input terminal as is required for $V_0$ to reach its final value after $V_1$ is applied to the input terminal.

The performance of the circuit enclosed within the dash lines can be significantly improved by including in this circuit the combination of resistors $R_7$, $R_5$, $R_8$, capacitor 32, and operational amplifier 36, which combination is identical, except for resistance and capacitance values, to the combination of resistors $R_4$, $R_6$, $R_{10}$, capacitor 48, and operational amplifier 44. During the positive half-cycles of the input AC signals, negative half-wave rectified voltage $V_2$ and $V_{1p}$ are applied to amplifier 44 by input resistors $R_6$ and $R_4$, respectively, in substantially the same manner as was previously described. $V_{1p}$, however, is also applied to amplifier 36 by input resistor $R_5$. If filter capacitor 32 is not in the circuit, amplifier 36 simply inverts $V_{1p}$ to produce $V_5$, a negative half-wave rectified voltage proportional to $V_{1p}$ as shown below:

$$V_5 = \left(-\frac{V_{1p}}{R_5}\right) R_8 = -V_{1p}$$

if $R_5 = R_8 = R_7$.

During the negative half-cycles of the input AC signals, diode 20 conducts causing feedback current to flow through load resistor $R_3$ and causing $V_4$ a positive half-wave rectified signal, to appear across resistor $R_7$, and input resistor of operational amplifier 36. Voltage $V_{1n}$ is simultaneously applied to amplifier 36 by resistor $R_5$. Thus, during the negative half-cycles of $V_1$, amplifier 36 adds voltage $V_{1n}$ and $V_4$ to produce $V_5$ as follows:

$$V_5 = \left(-\frac{V_4}{R_7}\right) R_8 - \frac{V_{1n}}{R_5} R_8 = -V_4 - V_{1n}$$

but is $R_3 = 2R_1$, $$V_4 = \left(-\frac{V_{1n}}{R_1}\right) R_3 = -2V_{1n}$$

therefore $$V_5 = 2V_{1n} - V_{1n} = V_{1n}$$

Therefore, during a complete cycle of input voltage $V_1$, the output voltage, $V_5$, of amplifier 36 is a negative full-wave rectified voltage. Voltage $V_5$ which is in effect a source of negative voltage, is produced in the same manner that $V_2$ and $V_1$ produce $V_0$, a positive full-wave rectified voltage. If filter capacitors 48 and 32 are connected in the circuit, $V_0$ becomes a positive voltage proportional to the RMS value of $V_1$; and $V_5$ through a proper selection of $R_8$, becomes a negative voltage proportional to the average amplitude of $V_1$. By making the capacitance of capacitor 32 small, $V_5$ quickly rises to its final value, but it will have a large AC component added to its DC value.

Amplifier 44 acts as an adder which adds the following voltages to produce output voltage $V_0$:

$$V_0 = \left(-\frac{V_1}{R_4}\right) R_{10} - \frac{V_2}{R_6} R_{10} - \frac{V_6}{R_8} R_{10}$$

$$V_0 = -\frac{R_{10}}{R_4} V_1 - \frac{R_{10}}{R_4} V_2 - \frac{R_{10}}{R_9} V_6$$

When $V_5$ first rises to its maximum value, $V_6$ will be almost equal to $V_5$. Since the resistance of $R_9$ is selected so that it is comparatively low relative to $R_{10}$, the ratio $R_{10}/R_9$ is large, and $V_6$ therefore initially produces a comparatively large voltage at the output of amplifier 44. This large voltage is added to the aggregate voltage developed by the addition of input voltage $V_1$ and voltage $V_2$ to produce the output voltage $V_0$. Due to the large component of $V_0$ produced by $V_6$, capacitor 48 charges much more rapidly than it would if $R_9$ were not connected to amplifier 44. Voltage $V_5$ is determined by the adjustment of variable resistor $R_8$ so that $V_0$ reaches its final value in a minimum length of time.

As long as the current in $R_9$ is in one direction, it will increase the voltage $V_0$, and thus also increase the current which charges capacitor 48. However, when the voltage across capacitor 40 becomes equal to the average value of $V_5$, only the alternating components of $V_5$ will cause current flow in capacitor 40 and resistor $R_9$, that is, capacitor 40 blocks the DC components of $V_5$ from summing function 60. Voltage $V_6$ will then become an alternating voltage with equal amplitude positive and negative half-cycles. Thus, voltage $V_6$ adds an alternating component to $V_0$. Since the alternating component added to $V_0$ by $V_6$ has equal positive and negative half-cycles, it will not change the final value of $V_0$ which is equal to the RMS value of $V_1$.

Capacitor 40 has a high impedance to low frequency voltages so that only a small low frequency component is added to $V_0$. The high frequency components which pass through capacitor 40 are easily filtered out by capacitor 48.

When $V_1$ is removed from input terminal 10, voltage $V_5$ quickly drops to zero. Capacitor 40 then discharges, and a current is passed through resistor $R_9$. Thus, the process described for producing the DC output voltage is reversed, and the output voltage $V_0$ drops to zero volts in approximately the same length of time required for it to reach its steady state value.

With operational amplifier 36 and its associated components in the converter circuit, a much shorter time period is required for the converter output voltage to reach its steady state output than is required if amplifier 36 is not included in the converter circuit. For example, if $R_4$, $R_6$, and $R_{10}$ are 20 kilohms; capacitor 48 and capacitor 40 are about 100 $\mu$farads; $R_9$ is about 2.5 kilohms; and $V_1$ is between 1 and 10 volts, $V_0$ will reach its final value in about one second. If amplifier 36 and its associated components are not included in the converter circuit and identical values of resistance and capacitance given above are used in the circuit enclosed within the dash lines, $V_0$ will reach its final value in about twenty seconds. The ripple of the output voltage $V_0$ is approximately the same or without amplifier 36 and its associated components in the circuit. For example, with an input voltage of 6.5 volts RMS to 60 cycles frequency, the ripple is about 0.01 volt at 120 cycles. If the other components have the values listed above, and $R_9$ is about 500 ohms, the time required for $V_0$ to reach its final value is about 0.3 second. With this value of $R_9$, the ripple only increases from 0.01 to about 0.015 volt.

In several prior art AC to DC converters using operational amplifiers, the output voltage has a maximum error equal to the sum of the individual errors of the operational amplifiers. When the converter of the present invention reaches a steady state condition, $V_5$, the output of amplifier 36, does not effect the output voltage of $V_0$. The error of $V_0$ will be equal only to the error introduced by amplifier 44. Thus, since the errors of the two amplifiers, 36 and 44 are not additive, they need not be high quality amplifiers.

Obviously many modifications and variations of the present invention are possible in the light of the above teachings. It is therefore to be understood that within the scope of the inventive concept the invention may be practiced otherwise than is specifically described.

What is claimed is:
1. A high-speed AC to DC converter comprising:
 (a) an input terminal to which input AC signals are applied;
 (b) a first resistor connected between said input terminal and the input of a first operational amplifier, said operational amplifier having a pair of feedback paths;
 (c) rectifier means connected in said feedback paths, said rectifier means comprised of a first diode in one of said feedback paths arranged to permit current flow only during the positive half-cycles of said input AC signals, a second diode in the other of said feedback paths arranged to permit current flow only during the negative half-cycles of said input AC signals and a load resistor in each of said feedback paths;
 (d) a second resistor connected between said input terminal and the input of a second amplifier, said second amplifier having connected in parallel relation thereto a load resistor and a capacitive filter;
 (e) a third resistor arranged to derive an output signal from across one of said load resistors in said feedback path and to couple said output signal into the input of said second amplifier;
 (f) a fourth resistor and a capacitor connected in series between the output of said second operational amplifier and the input of a third operational amplifier, said third operational amplifier having connected in parallel relation thereto a load resistor and a capacitive filter, said load resistor having a resistance at least a multiple number of times greater than the resistance of said fourth resistor;
 (g) a fifth resistor arranged to derive an output signal from across the other of said load resistors in said feedback path and to couple said output signal to the input of said third operational amplifier;
 (h) a sixth resistor connected between said input terminal and said input of the third operational amplifier; and
 (i) an output terminal at which DC signals are derived, said output terminal being connected to the output of said third operational amplifier.

2. The circuit of claim 1 wherein said first and second diodes are connected in parallel and are oppositely polarized.

References Cited

UNITED STATES PATENTS 3,311,835   3/1967   Richman _____ 328—127X

ROY LAKE, Primary Examiner

J. B. MULLINS, Assistant Examiner

U.S. Cl. X.R.

307—229, 261; 328—127